United States Patent
Ang et al.

(10) Patent No.: US 9,019,821 B2
(45) Date of Patent: Apr. 28, 2015

(54) ACCOUNTING BASED ON ACTIVE PACKET TIME

(75) Inventors: Soon Teck Gibson Ang, Nashua, NH (US); Min Jiang, Acton, MA (US); Xian Cheng, Acton, MA (US); King Ma, Tewskbury, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2273 days.

(21) Appl. No.: 11/477,617

(22) Filed: Jun. 30, 2006

(65) Prior Publication Data

US 2007/0121497 A1 May 31, 2007

Related U.S. Application Data

(60) Provisional application No. 60/726,427, filed on Oct. 13, 2005.

(51) Int. Cl.
| | |
|---|---|
| *H04L 12/26* | (2006.01) |
| *H04J 3/24* | (2006.01) |
| *H04M 11/00* | (2006.01) |
| *H04L 12/14* | (2006.01) |
| *H04W 4/24* | (2009.01) |

(52) U.S. Cl.
CPC ............ *H04L 12/14* (2013.01); *H04L 12/1432* (2013.01); *H04L 12/1439* (2013.01); *H04M 2215/2026* (2013.01); *H04W 4/24* (2013.01)

(58) Field of Classification Search
CPC ... H04W 76/045; H04L 1/16; H04L 61/1529; H04L 67/14; G10L 19/167; H04M 15/31; H04M 15/41; H04M 15/43; H04M 15/56
See application file for complete search history.

(56) References Cited

U.S. PATENT DOCUMENTS

| | | | |
|---|---|---|---|
| 6,452,905 B1 | 9/2002 | Smith et al. | |
| 6,643,262 B1 | 11/2003 | Larsson et al. | |
| 7,466,657 B1 * | 12/2008 | Van Der Wal et al. | ........ 370/252 |
| 7,720,960 B2 | 5/2010 | Pruss et al. | |
| 2001/0026546 A1 * | 10/2001 | Schieder et al. | .............. 370/338 |
| 2003/0093267 A1 * | 5/2003 | Leichtling et al. | ............. 704/215 |
| 2004/0116140 A1 * | 6/2004 | Babbar et al. | ................. 455/517 |
| 2004/0152444 A1 * | 8/2004 | Lialiamou et al. | ............ 455/406 |
| 2004/0258229 A1 * | 12/2004 | Mayron | ..................... 379/114.2 |

* cited by examiner

*Primary Examiner* — Melanie Jagannathan
(74) *Attorney, Agent, or Firm* — Capitol Patent & Trademark Law Firm, PLLC (57) ABSTRACT

An accounting method, system, device, and a computer-readable medium. The accounting method, system, device, and a computer-readable medium provide for measuring a time interval between arrival of two adjacent packets, comparing the measured time interval to a predetermined threshold, and determining whether the measured time interval is an active packet transfer time based on the comparison. Accordingly, an active packet transfer time in a connection is obtained.

21 Claims, 4 Drawing Sheets

ACCOUNTING BASED ON ACTIVE PACKET TIME

CROSS-REFERENCES TO RELATED APPLICATIONS

This application claims benefit pursuant to 35 U.S.C. §120 of the filing date of the Provisional Application Ser. No. 60/726,427 filed on Oct. 13, 2005 and titled "ACCOUNTING BASED ON ACTIVE PACKET TIME," which is incorporated herein by reference for all that it discloses.

BACKGROUND OF THE INVENTION

1. Field of the Invention

The present invention generally relates to accounting for a connection, and more specifically to a system and a method for accounting based on active time periods in a connection.

2. Description of the Related Art

Nowadays, packet switched networks such as internet are widely used to transmit all sorts of data. Internet protocol is commonly used to transmit applications, games, audio, video, and other multimedia data. For example, Voice over IP (VoIP) provides a cheap solution for international calls by transmitting voice data over the internet. Real-Time Transport Protocol (RTP) transmits real-time data such as audio and video over the internet. Recently, the packet switched networks were expanded to transmit data to mobile devices such as a laptop, a cellular telephone, a personal data assistance device, and so on. For example, in a universal mobile telecommunications system (UMTS), a General Packet Radio Service (GPRS) guarantees mobile devices uninterrupted access to the Internet, at a fast speed. Because of the fast data transmission by the GPRS system, subscribers may take part in video conferences, and use the mobile device to perform interactive communication with multimedia web sites e.g., play games and watch videos.

Transmitting these data over wired lines such as public switched telephone network (PSTN) is relatively cheap for the subscribers. That is, with the PSTN, subscribers often have an unlimited monthly access or may pay on a call by call basis. Since a large volume of data may be transmitted in a single call, the communication is cheap. On the other hand, communicating via wireless communication networks is more costly. In the wireless communications networks, the service providers may charge based on the amount of data (i.e., kilo bytes) downloaded and/or based on the time of the connection. Time of the connection is determined from the time the user establishes connection with the network to the time the user disconnects from the network.

These techniques, however, do not allow the service providers to manage, control, and charge according to the true packet time. That is, the inactive and active time periods in the connection are not differentiated, resulting, for example, in the subscribers being charged for the entire duration of the connection. In existing billing solutions, the subscribers are charged based on life time of the connection regardless of packets' arrival.

SUMMARY OF THE INVENTION

Accordingly to an exemplary, non-limiting formulation of the present invention, an accounting method is provided. The accounting method includes measuring a time interval between arrival of two adjacent packets, comparing the measured time interval to a threshold; and determining whether the measured time interval is active packet transfer time based on said comparison.

According to another exemplary, non-limiting formulation of the present invention, an accounting system implemented on a computer is provided. The accounting system includes a measuring module, which measures a time interval between arrival of two adjacent packets, a comparison module, which compares the measured time interval to a predetermined threshold, and a determining module, which determines whether the measured time interval is an active packet transfer time based on the comparison executed by the comparison module.

According to yet another exemplary, non-limiting embodiment of the present invention, a network device is provided. The network device includes a receiving interface receiving packets from a public data network and a processor. The processor measures a time interval between arrival of two adjacent packets, compares the measured time interval to a predetermined threshold, and determines whether the measured time interval is an active packet transfer time based on the comparison.

According to another exemplary, non-limiting embodiment of the present invention, a computer-readable medium storing instructions is provided. The instructions include measuring a time interval between arrival of two adjacent packets, comparing the measured time interval to a predetermined threshold, and determining whether the measured time interval is an active packet transfer time based on said comparison.

BRIEF DESCRIPTION OF THE DRAWINGS

The accompanying drawings, which are incorporated in and constitute a part of this specification exemplify the embodiments of the present invention and, together with the description, serve to explain and illustrate exemplary principles of the inventive technique. Specifically.

DETAILED DESCRIPTION OF EXEMPLARY EMBODIMENTS

In the following detailed description, reference will be made to the accompanying drawings, in which analogous functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limiting sense. Additionally, the various embodiments of the present invention as described may be implemented in the form of software running on a general purpose computer, in the form of a specialized hardware, or a combination of software and hardware.

In an exemplary, non-limiting embodiment of the inventive concept, it is possible to account for the time when there is activity in the system i.e., the time it takes to transport the packets through the system. An exemplary, non-limiting embodiment of the inventive concept allows for measuring the active packet time. That is, it is possible to account for the time in which the subscriber is actually receiving packets such as when the subscriber is watching the video data streams. That is, it is possible to discriminate between the times when the connection is established but no packets are transported such as pause times or delay times and the times when there are active transfer of packets such as during watching of the video data streams. Accordingly, by accounting for the active packet transfer time, more flexibility is provided in managing communications sessions, controlling access to services, controlling traffic, and billing the subscribers.

For example, bandwidth may be allocated in accordance with the active packet time. By way of another example, based on the accounting for the active packet time, charging of the subscribers may be made more accurate. For example, the subscriber would not be charged for the time intervals when there is a pause—an interruption of packet transfer during the connection. That is, only the "qualified" time intervals would be counted towards charging the subscribers. The qualified time intervals are the time intervals between actual arrivals of the packets. Accordingly, billing may be provided with more accuracy, flexibility, and granularity.

Figure 1:
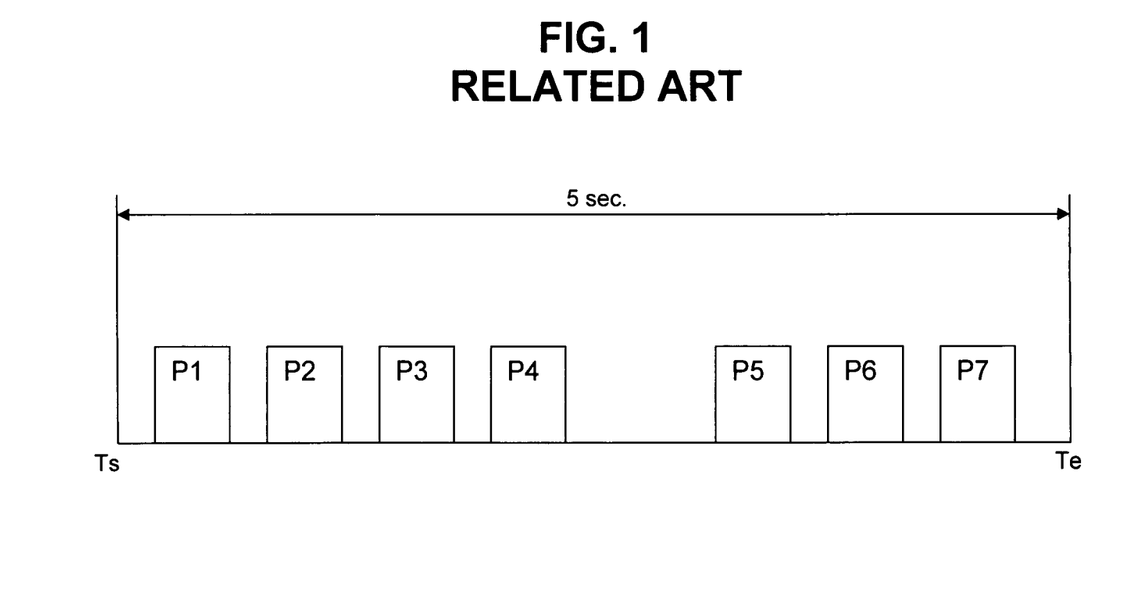
FIG. 1 is a time chart illustrating charging based on connection time in the related art billing methods.

For example, FIG. 1 illustrates a related art technique, where only the lifetime of a connection is being measured. FIG. 1 illustrates that the data connection between two parties is established at time Ts and ends at time Te. The connection duration is: Te−Ts=five seconds. During the connection, seven packets P1, P2, . . . P7 are transmitted from a first entity to a second entity. The interval between the arrivals of packets to a device of the second entity varies. As depicted in FIG. 1, there is an interruption in transmission between the packet P4 and the packet P5, possibly due to a pause in the transmission of data packets. Regardless of this interruption interval, the related art techniques can only account for the entire duration of the connection. That is, the related art techniques will only determine and report the total time of connection i.e., five seconds. This report of only the total time of the connection provides little flexibility for the service providers in further management of connections and subscribers.

For example, if the second entity spent three minutes waiting for data streaming e.g., due to high traffic volume or if the data streaming was paused e.g., by a user, the second entity may be dissatisfied with this long waiting period and be unwilling to pay for this inactivity time. Accordingly, the second entity would then contact the service provider and request that this time be removed from their bill (credited to the second entity's account). The service provider cannot verify the accuracy of the second entity's allegations, as there are no measurements of the active packet time. As such, the service provider is forced to either credit these entire three minutes of connection to the second entity's account or charge the second entity for the entire duration of connection, thereby damaging customer relations.

Contrary to the related art technique, in an exemplary embodiment of the inventive concept, accounting for active packet time is provided. As such, the service provider may verify the requested credit of the second entity based on the measurements of the active packet time. Moreover, based on the accounting of the active packet time, the service providers may automatically bill only for the active packet time, ignoring the interruption periods due to delays or pauses by the user.

Figure 2:
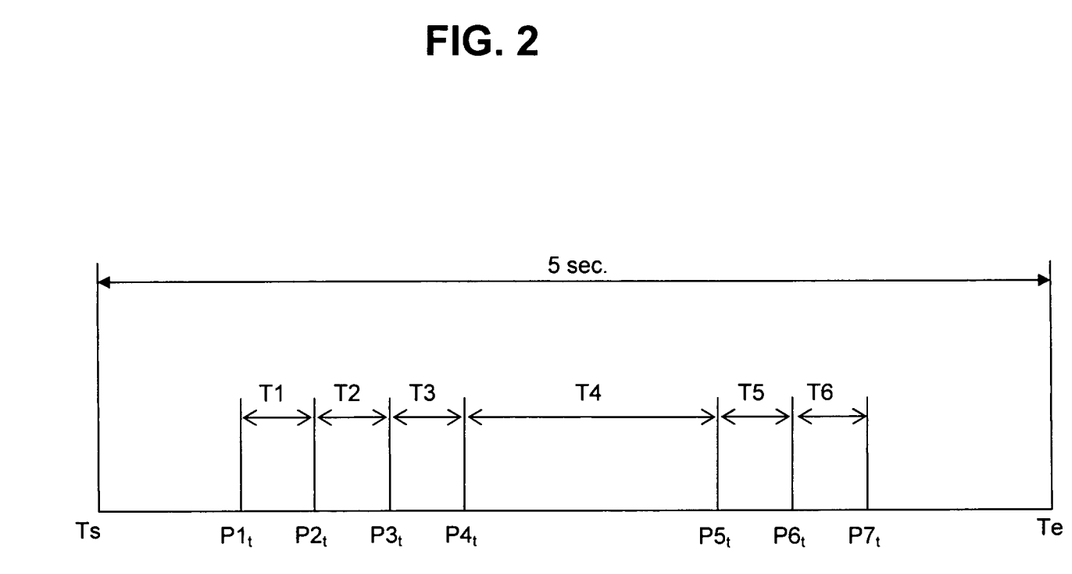
FIG. 2 is a time chart illustrating charging based on packet arrival time according to an exemplary embodiment of the present invention.

In particular, as depicted in FIG. 2, the connection between the two entities is established at a time Ts. The first packet P1 is received by the second entity at a time $P1_T$, the second packet P2 is received at a time $P2_T$ and so on. In other words, $P1_T, P2_T, \ldots P7_T$ denote the packet arrival time. In an exemplary embodiment of the inventive concept, the arrival time of each packet is monitored and is used to obtain active packet time.

As depicted in FIG. 2, when the connection between the two entities is established, the time interval between every two adjacent data packets is measured. In particular, the time interval between the arrival time $P1_T$ of the packet P1 and the arrival time $P2_T$ of the packet P2 is T1. The time interval between the arrival time $P2_T$ of the packet P2 and the arrival time $P3_T$ of the packet P3 is T2 and so on. This time interval is compared to a threshold to determine whether it qualifies as active packet time. For example, if this time interval is not greater than a given threshold, this time interval qualifies as an active packet time. If, on the other hand, this time interval is greater than a given threshold, this time interval is viewed as inactive time e.g., as a pause during which there is no active data transfer or as a delay in the network.

By way of an example, the time interval T4 between the arrival of the packet P4 and the packet P5 exceeds the threshold. Accordingly, the interval T4 does not qualify as an active packet time and will be excluded because it is "too" big. Accordingly, only the time intervals T1, T2, T3, T5, and T6 i.e., the qualified time intervals, will be reported as active data transfer times. In the related art techniques, only the entire duration of the connection i.e., five seconds, is reported. In an exemplary embodiment of the inventive concept, active packet time, which in a given example is: T1+T2+T3+T5+T6 that is less than five seconds (duration of the entire connection), is reported. Of course, the total duration of the connection may also be reported in addition to the active packet time. As a variation, the transfer time for delayed packet may be accounted for in numerous ways, as explained further below.

The threshold may be arbitrarily set by the service provider or may be automatically set by any entity, such as an entity measuring the active packet time. For example, the threshold may be set by monitoring time intervals between various packets for a predetermined period of time. The threshold may be adjusted based on packet size, traffic load, environmental factors (e.g., inclement weather), any other quality of service characteristics, and so on. Moreover, the threshold may be automatically adjusted in real-time based on various conditions such as quality of service characteristics within the communications system.

Exemplary operations executed by an entity determining the total active packet time for a connection is explained below with reference to FIG. 3. In operation 300, a call is set up and the connection is established between the receiving party and the transmitting party. The transmitting party may be another user or subscriber, an application's server of the service provider, or the internet. In operation 301, various counters and variable are initialized and the threshold is obtained. Various counters may include a counter for the total active packet time, a counter for the total number of bytes received, and a counter for the total number of packets received. Variables may include a variable for the current packet arrival time i.e., time at which the current packet is received, previous packet arrival time i.e., time at which the previous packet was received, packet time interval i.e., the difference between the arrival times of the current and previous packets. In this operation 301, the threshold may be configured automatically or may be configured manually by the service provider for example.

In operation 302, a data packet is received, parsed, and inspected. The time at which the packet is received is recorded i.e., the time value may be stored in the current packet arrival time variable, in operation 303. Next, in operation 304, a check is performed to determine whether or not this is the first packet during the established connection.

To determine whether this is the first packet during the established connection, various techniques may be used. For example, the arrival time of last packet may be set to zero during the initialization process e.g., in operation 301. By way of another example, the arrival time may be based on the local or GMT time. Accordingly, all packets will be using one of these times. Then, the last packet arrival time may be compared with the time in which the connection is established (Ts or Ts+C, where C is a constant) and if the last packet arrival time is before the Ts or Ts+C, then it is determined that it is the first packet in the current connection. By way of another example, the first packet may be determined by checking one of the counters (such as total number of packets received), which are initialized at the beginning of connection. In short, a variety of techniques may be used in operation 304 to determine whether the arrived packet is the first packet per the established connection.

If it is determined in operation 304 that this is the first packet in the connection, the previous (last) packet time is set to the current packet time, and the byte counter and the packet counter are updated. The accounting entity returns to waiting for the next packet, in operation 305, as shown in FIG. 3. For example, the total number of bytes counter may be incremented by the number of bytes received in the payload of the current packet. The total number of packets received counter may be incremented by one or by any other number i.e., if several packets are received in an envelope of one packet.

On the other hand, if, in operation 304, it is determined that this is not the first or initial packet, the packet interval is determined in operation 306. In particular, the packet interval time is determined by subtracting from the current arrival time (current packet time) the previous arrival time (stored as the last packet time). For example, if the last packet arrived at 3:57:30 pm and the current packet arrived at 3:57:32 pm, the interval is determined to be two seconds (3:57:32 pm-3:57:30 pm). In operation 307, the determined packet time interval is compared to a threshold. For example, if the determined packet time interval is equal to or exceeds the threshold, then the process returns to operation 305, in which the last packet time variable is set to the current packet arrival time and in which the byte and packet counters are updated. The accounting entity then waits for the next packet, as shown in FIG. 3.

If the determined packet time interval is below the threshold in operation 307, the total active packet time counter is updated, in operation 308. The total active packet time counter may be incremented by the determined packet time interval e.g., in the example provided above—by two seconds. Next, the process returns to operation 305, in which the last packet time is set to the current packet time and the byte and packet counters are updated. The accounting entity then waits for the next packet, as shown in FIG. 3.

The total active packet time and other statistics such as byte count and packet count accumulated during the connection may be reported to the final accounting records under certain conditions. The accounting entity may have a separate storage such as a database for storing the accumulated statistics along with the identification of the mobile devices receiving the packets.

Figure 3:
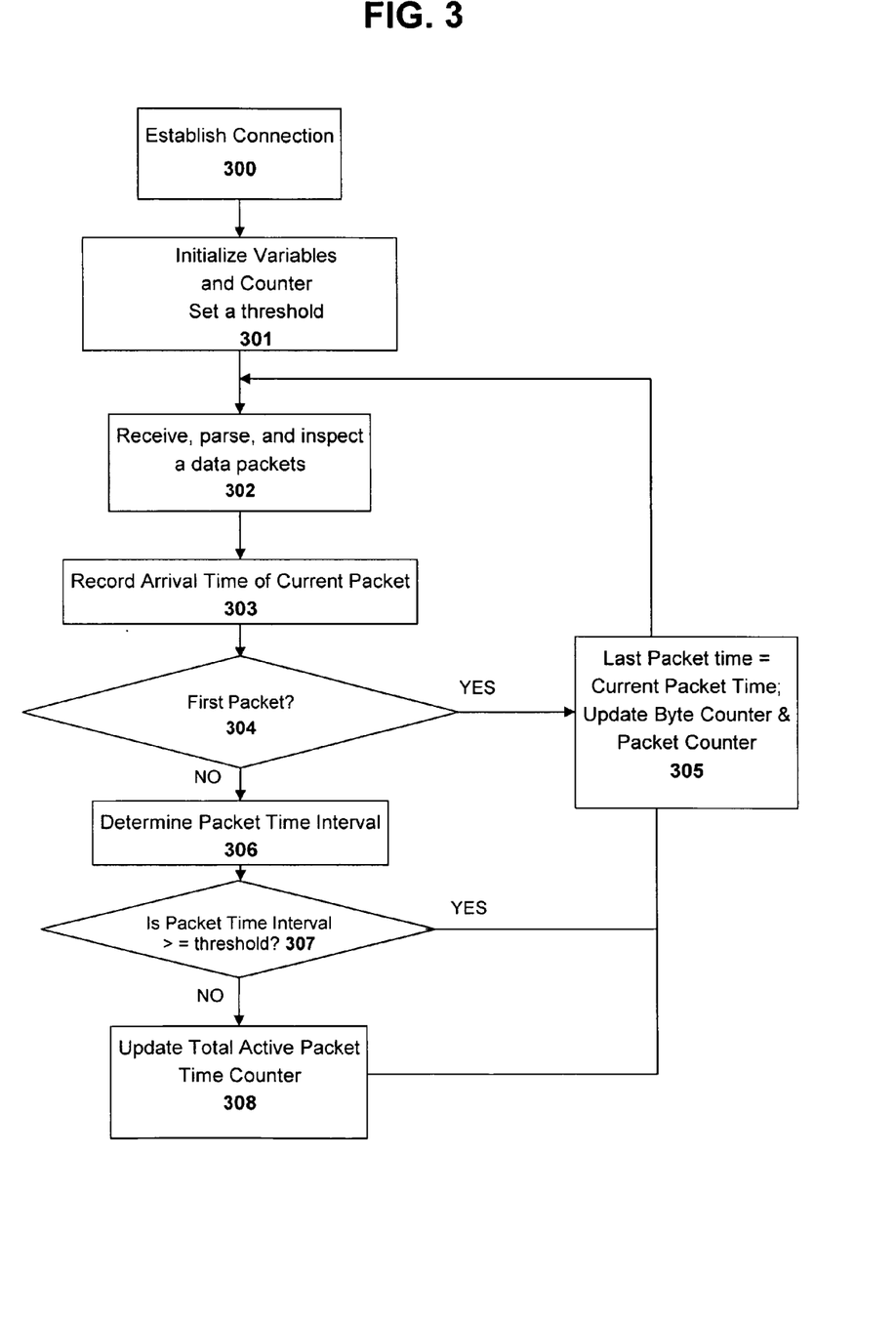
FIG. 3 is a flow chart illustrating the process of obtaining total charging time during a connection according to an exemplary embodiment of the present invention.

The exemplary process depicted in FIG. 3 may be implements in a form of software modules or computer instructions executed in the entity measuring the active packet time.

According to another exemplary embodiment of the inventive concept, the packet time intervals that do not qualify as active packet time may be replaced with a constant value (hereinafter "a second threshold"). In other words, when the time interval includes the inactive time, this time interval is replaced by the constant value such as the second threshold. This second threshold may be the same threshold used in operation 307 depicted in FIG. 3 or may be a different threshold. If the threshold (Th) is the same as used in operation 307, then in an exemplary embodiment depicted in FIG. 2, the total active time would be: T1+T2+T3+Th+T5+T6. That is, since T4 is greater than Th, Th is substituted as active packet time for the time interval between the third and fourth packet. As explained above, a predetermined threshold Th may be used to replace a time period that is too big or the threshold Th may be set to zero (0) not to account for the lengthy time interval.

By way of another example, when the first packet is received (in operation 304, it is determined that the packet received is the initial or first packet in the established connection), the total active packet time counter may be updated to reflect the second threshold as opposed to the time interval from the time connection was established to the time the first packet was received. That is, the time interval for receiving the first packet is replaced by this second threshold. Similarly, when the packet is received after a pause or some other interruption in the data transfer (in operation 307, "packet time interval>=threshold"), this time interval is replaced by this second threshold, and the active packet time counter may be updated to reflect the second threshold as opposed to the actual packet time e.g., the second threshold may be added to the total time value stored in the total active packet time counter. In other words, when the time interval is too big, it is replaced by the second threshold, and the active packet time counter is updated to reflect this second threshold.

Figure 4:
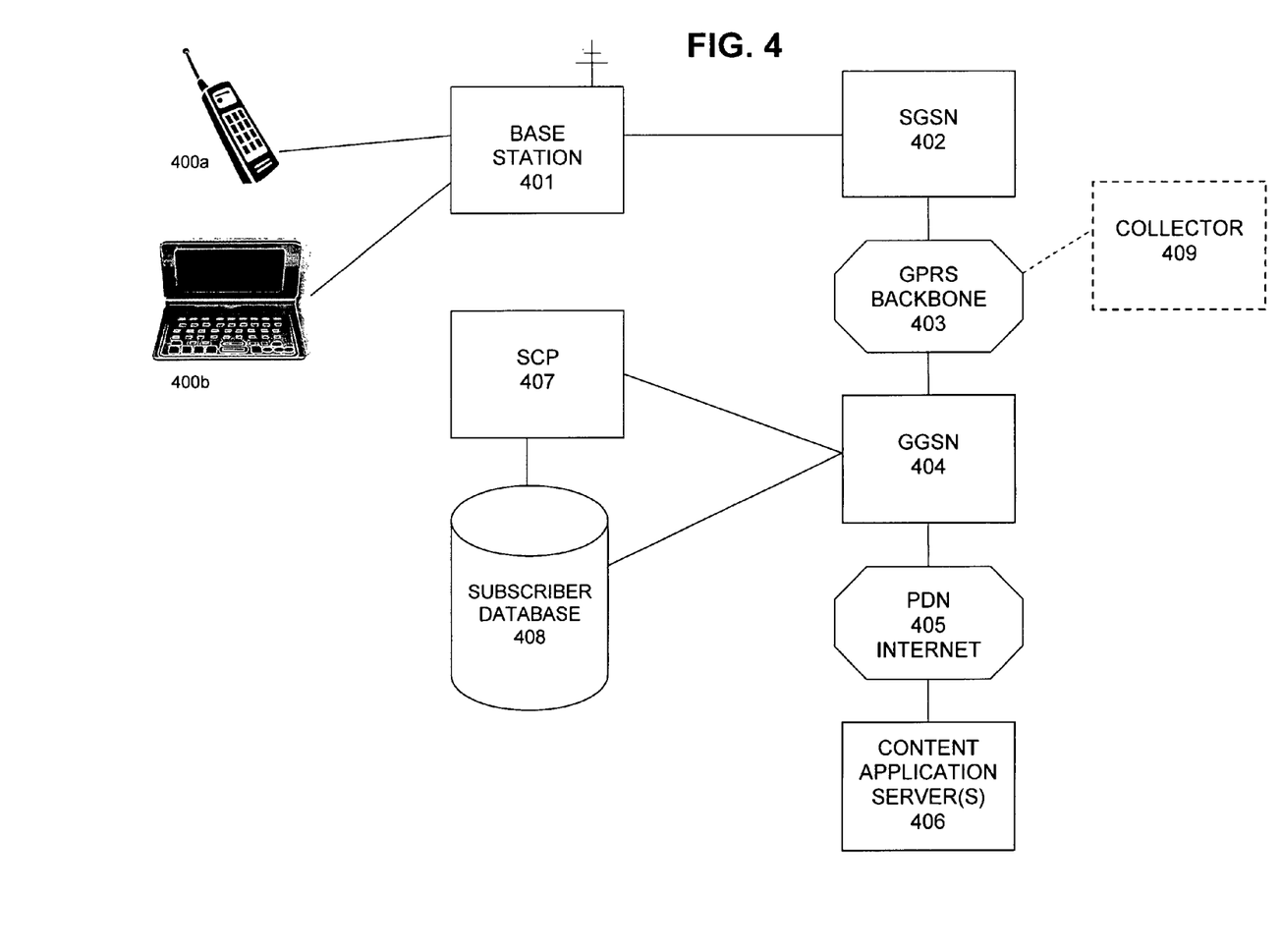
FIG. 4 is a block diagram illustrating a telecommunication system according to an exemplary embodiment of the present invention.

According to another exemplary embodiment of the inventive concept, the mobile device 400 such a mobile telephone or personal data assistant 400a or a notebook 400b is connected to the base station 401 as depicted in FIG. 4. The base station 401 is in turn connected to a serving GPRS supporting node (SGSN) 402. The SGSN 402 connects the base station 401 to the GPRS system 403 (depicted as GPRS backbone 403 in FIG. 4), which in turn is connected to the gateway GPRS support node (GGSN) 404 and the accounting node 409 (explained in greater detail below).

The GPRS support node 404 establishes a connection with the public data network (PDN) 405 such as the internet to obtain data from the content/application server 406 of a service provider for providing mobile devices with various multimedia data such as tunes, games, and other applications. By way of an example only, one content application server 406 is depicted in FIG. 4. However, there could be many content application servers 406 of various service providers, which are accessed via the PDN 405.

The GGSN 404 may further establish a connection with the service control point (SCP) 407, which manages the subscriber database 408. The SCP 407 handles prepaid accounts by managing in real time the current account balances. The GGSN 404 may also connect directly to the subscriber database 408 for other accounts such as periodic billing accounts. The subscriber database 408 is provided by way of an example only and not by way of a limitation. The subscriber database 408 may be any storage device for storing subscriber information currently known or later developed. The subscriber database may store information such as the total active packet time and other statistics such as the total connection time, the total number of bytes received by the subscriber, and the total number of packets received by the subscriber, for a predetermined period of time. This subscriber information may be accumulated during this predetermined period of time and later reported to the subscriber database 408 or directly to the service providers. This information may be used to manage the network such as controlling access to data, traffic on the network, and so on.

According to an exemplary embodiment of the inventive concept, the GGSN 404 may include a collector 409 or the collector may be a separate node as depicted in FIG. 4. The GGSN 404 parses and inspects each packet in order to update the total active packet time and other statistics for various connections. That is, the GGSN 404 generates a call detail record and forwards the call detail records to the collector 409 in which these records are stored. Once the total active packet time and other statistics are processed, the GGSN 404 forwards the packet to the SGSN 402 via the GPRS backbone 403. The packets are then provided to the mobile devices 400a and 400b via the base station 401. When any one of the threshold is met (e.g. time, volume, access network, etc), the GGSN may send the call detail records to the collector 409. The collector 409 accumulates the call detail records and forwards them to a billing entity after a predetermined interval of time or the GGSN 404 sends the collected call detail records to the external collector 409, which will then consolidate other call detail records from the nodes before it forwards them to the billing entity.

The collector 409 accumulates the total active packet time and other statistics such as the total number of bytes received and the total number of packets received, for a pre-set period of time and then reports the accumulated subscriber data to the billing server. The GGSN 404, either directly or via the SCP 407, accesses the subscribers' records stored in the subscriber database 408 and updates the information in these records based on the reported data. By way of a variation, any entity that performs deep packet inspection may calculate the total active packet time and other statistics. In other words, any access control device or gateway entity that performs a packet inspection may account for active packet time. For example, the GGSN 404, the SGSN 402, or any other node between the SGSN 402 and the content server 406 may perform the deep packet inspection and pass the results to a collector 409 or the SCP 407. The collector 409 may be a separate node located either between the SGSN 402 and the GGSN 404 or between the GGSN 404 and the content server 406 or the collector 409 may be incorporated into one or mode nodes of the GPRS network including the GGSN 404 and the SGSN 402, and even into the base station 401. The collector 409 gathers call detail records generated from the node, consolidates them, and passes them to the billing entity.

Although additional time may be required from delivering the packet from the GPRS network to the mobile devices, this time is negligible. That is, a majority of data transfer time is spent in obtaining data from the content application server and transferring the obtained data via the PDN network. In comparison to the time it takes to transfer a packet via the PDN network, the transfer time from the GPRS network to the mobile device is trivial. Accordingly, it is possible to simply disregard this time and not add it to the calculations of the total active packet time. By way of a variation, however, a constant time interval may be added to account for this trivial time period. By way of an example, the GGSN 404 may add 5 ms to each time interval to compensate for the delivery time from the GGSN 404 to the mobile device.

In an exemplary system depicted in FIG. 4, an "always on" connection may be established. For example, in order for the mobile devices 400 to have access to the PDN 405, a connection with the GPRS 403 is established. Due to the call setup time, an "always on" connection is established i.e., once the connection is established, it remains "on" even when the mobile device 400 is not communicating with the PDN. That is, the connection remains on until the mobile device requests to disconnect from the network. In this "always on" connection, real-time stream data services such as network-based video, mobile-based web services (e.g. movies, TV, shopping, navigation), and multi-media gaming is provided. In an exemplary embodiment of the inventive concept, the GGSN 404 then accounts for the active packet time during this "always on" connection and stores it in the collector 409. In particular, the GGSN 404 will account for the "play" time (active packet time) and not for the "pause" time (when no packets are transferred). That is, by determining the interval time between the arrival of packets, the "play" time and the "pause" time can be distinguished.

The active packet time calculations may be activated on a per service access. That is, for certain services only other statistics may be accumulated and for others, active packet time will be calculated. The active packet time may be calculated differently depending on the content being accessed and the configuration. Moreover, the thresholds may vary from one service to another. The thresholds may further vary based on the content being accessed and the configuration. Accordingly, by providing these variations, the service providers obtain more flexibility at least in access management, traffic management, and billing. For example, accurate accounting may be provided by charging the subscriber for only the active transmission time and not based on the entire duration of the connection.

In another exemplary embodiment of the inventive concept, as opposed to monitoring the time intervals between the arrival of data packets, time intervals between the arrival of acknowledgement packets may be monitored. For example, when the mobile device receives a packet from the service provider, an acknowledgement packet is sent to a controlling entity such as a controller e.g., the GGSN, SGSN, the base station, and so on. The controlling entity determines time intervals between the acknowledgment packets and compares these time intervals to a predetermined threshold. When the time interval between the time of receipt of the two adjacent acknowledgment packets is equal to or greater than a predetermined threshold, this time interval is not included in the total active packet time. When the time interval is below the threshold, the controlling entity adds this time interval to the total active packet time. That is, the active packet transfer time is determined based on the time intervals between the acknowledgement packets.

Many other variations are within the scope of the invention. For example, the controlling entity may have one or more special counters that would keep track of a total excluded interval time by storing time of all the time intervals that are above a threshold. Then, at the end of a connection, the accounting entity would simply subtract from the total connection time the total excluded time, thereby accounting for active packet time. By way of a variation, each excluded time interval may be replaced with a predetermined time (Th) and these one or more Th may be added to the active packet time. This may be especially beneficial for high quality services, where there would be few intervals above the predetermined threshold. This may reduce the computational load in obtaining active account time of the high quality services.

Furthermore, in another exemplary embodiment of the inventive concept only a portion of interval may be excluded from the total billing time, by replacing the excluded intervals with the second threshold, as explained in greater detail above.

The exemplary accounting methods and systems provided above may also be implemented in more generic applications as long as there is active packet time. For example, the above described accounting methods and systems may be applied to VoIP data, RTP data, SIP data, push-to-any media data such as push-to-video data, gaming application, and so on.

The telecommunications system illustrated in FIG. 4 is provided by way of an example and not by way of a limitation. The exemplary accounting methods may be implemented in networks employing such features as Universal Mobile Transmission System (UMTS), Code Division Multiple Access (CDMA), Wireless-CDMA, CDMA-2000, Wireless Local Access Network (WLAN) such as Wireless Fidelity (WiFi), IP Multimedia sub-system (IMS), and so on.

For example, an exemplary process depicted in FIG. 3 may be implemented in IP TV system or on demand TV system, where a user accesses content via these systems in the office or at home. In this case, the service provider may have different pricing plan where the user can be watching the content live and be charged per month, per access, per time watch, etc. In these types of services, accounting for active packet time may help better manage and control the system, as well as provide more accurate connection time to the service provider, for example, for billing purposes. In addition, accounting for active packet time may be implemented in VoIP and different Class of Services (CoS) for the type of traffic going through the broadband networks. For example, in the VoIP, instead of the connection time, the user may be charged based on the time the user accesses the network. (i.e., the active packet time).

By way of another variation, an exemplary process depicted in FIG. 3 may be implemented in a session border gateway, which acts as a gateway between home/enterprise network to the operator network. Based on the calculated active packet time, the session border gateway may provide access control, charge control, bandwidth control, and so on.

The above and other features of the invention including various novel operations and a system of the various parts and components have been particularly described with reference to the accompanying drawings and pointed out in the claims. It will be understood that the particular process and construction of parts embodying the present invention is shown by way of illustration only and not as a limitation of the invention. The principles and features of this invention may be employed singly or in any combination in varied and numerous embodiments without departing from the spirit and scope of the invention as defined by the appended claims and the equivalents thereof.

What is claimed is:

1. A method for charging for active packet transfer time interval comprising:
    creating an always-on connection during call set-up with a subscriber's mobile device, the always-on connection remaining on once established during an active, inactive and constant packet transfer time interval and disconnecting as requested by the mobile device;
    measuring a time interval between arrival of two adjacent packets in the always-on connection;
    comparing the measured time interval to a predetermined threshold;
    determining whether the measured time interval is an active packet transfer time interval based on said comparison; and
    charging the subscriber for an active packet transfer time interval within the always-on connection based on a determination that the predetermined threshold is exceeded.

2. The method according to claim 1 further comprising determining the measured time interval is an inactive time interval in the connection when the measured time interval is above the predetermined threshold.

3. The method according to claim 2, wherein the inactive time interval is an interval in the connection in which packets are not transferred or significantly delayed in transfer, and the method further comprising replacing the inactive time interval with a constant time interval.

4. The method according to claim 1, further comprising determining the measured time interval is an active packet transfer time interval in the connection in which packets are transferred when the measured time interval is below or equal to the predetermined threshold.

5. The method according to claim 1 further comprising measuring the time interval based on a difference between arrival times of the two adjacent packets.

6. The method according to claim 5 further comprising replacing a reference arrival time, which corresponds to an arrival time of one of the adjacent packets, with an arrival time of another adjacent packet.

7. The method according to claim 1 further comprising transferring at least said two adjacent packets, and determining a play mode or a pause mode based on whether the measured time interval is below, equal to, or above the predetermined threshold.

8. The method according to claim 1, further comprising selecting a threshold from a list of thresholds based on at least one of quality of service parameters of the connection or a network configuration.

9. The method according to claim 1, further comprising:
    measuring a total connection time;
    selecting the total connection time for charging the subscriber when the connection comprises a wireless access protocol connection; and
    selecting the active packet transfer time interval for charging the subscriber when the connection comprises a data streaming connection.

10. A system implemented on a computer, the system comprising:
    a measuring module for measuring a time interval between arrival of two adjacent packets in an always-on connection created during call set-up with a subscriber's mobile device, the always-on connection remaining on once established during an active, inactive and constant packet transfer time interval and disconnecting as requested by the mobile device;
    a comparison module for comparing the measured time interval to a threshold;
    a determining module for determining whether the measured time interval is an active packet transfer time interval based on the comparison executed by the comparison module; and
    a collection module for collecting information used to charge the subscriber for an active packet transfer time interval within the always-on connection based on a determination that the predetermined threshold is exceeded.

11. The system according to claim 10, the determining module for further determining that the measured time interval is an inactive time interval in the connection when the measured time interval is above the threshold.

12. The system according to claim 11, further comprising a replacing module for replacing the inactive time interval with a constant time interval, wherein the inactive time interval is an interval in the connection in which packets are not transferred or significantly delayed.

13. The system according to claim 10, the determining module for further determining the measured time interval is the active packet transfer time interval, in which packets are transferred, when the measured time interval is below or equal to the threshold.

14. The system according to claim 10, the measuring module for further measuring the time interval based on a difference between arrival times of the two adjacent packets.

15. The system according to claim 10, further comprising a selection module for selecting a threshold from a list of thresholds based on at least one of quality of service parameters of the connection and a network configuration.

16. A network device comprising:
   a receiving interface for receiving packets from a public data network;
   a processor for measuring a time interval between arrival of two adjacent packets in an always-on connection that remains "on" once established during an active, inactive and constant packet transfer time interval and disconnects from the public data network as requested by the network device, comparing the measured time interval to a predetermined threshold, and determining-whether the measured time interval is an active packet transfer time interval based on the comparison; and
   a collector for collecting information used to charge a subscriber for an active packet transfer time interval within the always-on connection based on a determination that the predetermined threshold is exceeded.

17. The network device according to claim 16, wherein the network device comprises one of an access control device, a deep packet inspection device, or a session gateway.

18. The network device according to claim 16, further comprising a transmitting interface for transmitting the received packets to a mobile device.

19. The network device according to claim 16, wherein the network device comprises one of a device of a network having features for a Universal Mobile Transmission System, a device of a network having features for Code Division Multiple Access, or a device of a Wireless Local Access Network.

20. The network device according to claim 16, the receiving interface for further receiving at least one of on demand TV content data or IP TV content data.

21. One or more memories for storing executable instructions, the instructions comprising:
   instructions for measuring a time interval between arrival of two adjacent packets in an always-on connection that remains "on" once established during an active, inactive and constant packet transfer time interval and disconnects as requested by a subscriber's device;
   instructions for comparing the measured time interval to a predetermined threshold;
   instructions for determining whether the measured time interval is an active packet transfer time interval based on said comparison; and
   instructions for charging a subscriber for an active packet transfer time interval within the always-on connection based on a determination that the predetermined threshold is exceeded.

* * * * *